United States Patent [19]

Hishinuma et al.

[11] 3,980,454

[45] Sept. 14, 1976

[54] ADSORPTION METHOD

[75] Inventors: Yukio Hishinuma; Zensuke Tamura, both of Hitachi; Syunzi Enomoto, Kure, all of Japan

[73] Assignees: Hitachi, Ltd.; Babcock-Hitachi K.K., both of Tokyo, Japan

[22] Filed: Jan. 29, 1975

[21] Appl. No.: 545,089

Related U.S. Application Data

[63] Continuation of Ser. No. 362,230, May 21, 1973, abandoned.

[30] Foreign Application Priority Data

May 19, 1972 Japan............................ 47-49057

[52] U.S. Cl............................................ 55/73; 55/74
[51] Int. Cl.²..................................... B01D 53/04
[58] Field of Search............ 55/73, 74, 179; 210/30, 210/32, 34, 89, 139, 140, 264, 340, 341; 423/244

[56] References Cited
UNITED STATES PATENTS

| | | | |
|---|---|---|---|
| 2,797,190 | 6/1957 | Scott et al............................ | 210/34 |
| 3,473,297 | 10/1969 | Tamura et al...................... | 423/244 |
| 3,486,852 | 12/1969 | Tamura et al...................... | 55/73 |
| 3,731,460 | 5/1973 | Narumi................................. | 55/179 |
| 3,772,854 | 11/1973 | Tamura et al...................... | 55/73 |

*Primary Examiner*—Charles N. Hart
*Assistant Examiner*—Ivars Cintins

[57] ABSTRACT

A contaminant, such as sulfur dioxide, is removed from a fluid, such as hot exhaust gas, by passing it through beds of material for removing the contaminants, such as activated carbon for adsorbing the sulfur dioxide as sulfur trioxide; periodically, the bed is regenerated by discontinuing the passage of process fluid therethrough and passing through the bed a regenerating fluid, such as water, with quantities of the regenerating fluid being successively passed through the bed with corresponding decreasing amounts of contaminants, such as sulfuric acid within the water, in the respective quantities of regenerative fluid. At least one further bed of material is regenerated with substantially the same regenerative fluid in substantially the same succession of concentrations, but out of phase so that a quantity of regenerative fluid of one contaminant concentration is passed completely through only one bed of material prior to its passing through another bed of material. Preferably, after passing through one bed of material, the regenerative fluid is of the next highest concentration and passes through another bed of material in the sequence of the next highest concentration.

3 Claims, 3 Drawing Figures

ADSORPTION METHOD

This is a continuation of application Ser. No. 362,230, filed May 21, 1973, now abandoned.

BACKGROUND OF THE INVENTION

The present invention particularly relates to process for regenerating adsorption systems employed for desulfurizing exhaust gas from, for example, a steam power plant and the like. Efficiency of operation and reduced manufacturing costs are of importance in such systems.

It is known to remove contaminants such as sulfur dioxide from exhaust gases with the use of active carbon or other similar adsorbents, and further to regenerate the adsorbents with for example water as the regenerating liquid. In order to facilitate the disposal of the regenerating or washing waste liquid, it is desirable to obtain concentration of contaminants within the liquid as high as possible, that is to obtain sulfuric acid of a concentration as high as possible. In order to obtain highly concentrated sulfuric acid, according to the conventional practices, a great number of washing tanks are provided and the washing is carried out repeatedly.

The sulfurous acid gas-adsorbing capacity of the adsorbent is sufficiently high during the initial stages, but with a lapse of time, the adsorbing capacity is lowered because the amount of adsorbed substance accumulated in the form of sulfuric acid increases. Accordingly, from the economical viewpoint it is reasonable to design the sulfurization apparatus so that the amount adsorbed per tank is small and the time for adsorption operation is shortened to repeat the adsorption and desorption many times over a short period of time.

As the volume of the gas to be treated increases, the number of beds of the adsorbent increases and the time for the adsorption is prolonged. Accordingly, it is reasonable to divide a great number of adsorbing beds into several series so as to conduct the adsorption and desorption in an appropriate time cycle and to perform the adsorption and desorption in each series according to the prescribed time schedule. However, in the conventional process and apparatus, a group of regenerating tanks are provided for each series, with the result that the size of the apparatus becomes extremely large and expensive, and correspondingly the construction and the maintenance of the apparatus is correspondingly a problem of considerable magnitude.

SUMMARY OF THE INVENTION

It is therefore a primary object of the present invention to provide an adsorbing process in which the operating efficiency of the apparatus can be improved and the adsorption can be accomplished with great economical advantages, as compared with the prior art. Accordingly, a plurality of adsorption unit series are employed with the entire adsorption equipment minimized by utilizing effectively the regeneration means commonly for each adsorbing bed, and thus the construction and maintenance expenses can be greatly reduced as compared with the prior art.

According to the present invention, the adsorption is performed by employing a plurality of unit adsorption series, each of which includes at least one adsorbing bed and preferably a plurality of adsorbing beds with each adsorbing bed being washed with a regenerating liquid in such a manner that the bed is at first washed with a regenerating liquid containing the substance to be desorbed from the adsorbent at a higher concentration and the concentration of the desorbed substance being gradually lowered with subsequently applied regenerating liquid fed for washing of the bed. Such a system is characterized in that the feeding of the regenerating liquid is conducted according to a time schedule prescribed respectively for each series and a phase difference is provided among the series so that one group of regenerating liquid storage tanks can be utilized for all of the series, with both method and apparatus being a part of the adsorbing system of the present invention.

BRIEF DESCRIPTION OF THE DRAWING

Further objects, features and advantages of the present invention will become more clear from the following detailed description of a preferred form of the invention, as shown in the accompanying drawing, wherein:

FIG. 2b is a chart of the operating schedule for the desulfurizing apparatus of FIG. 1 and FIG. 2a.

DETAILED DESCRIPTION OF THE INVENTION

Figure 1:
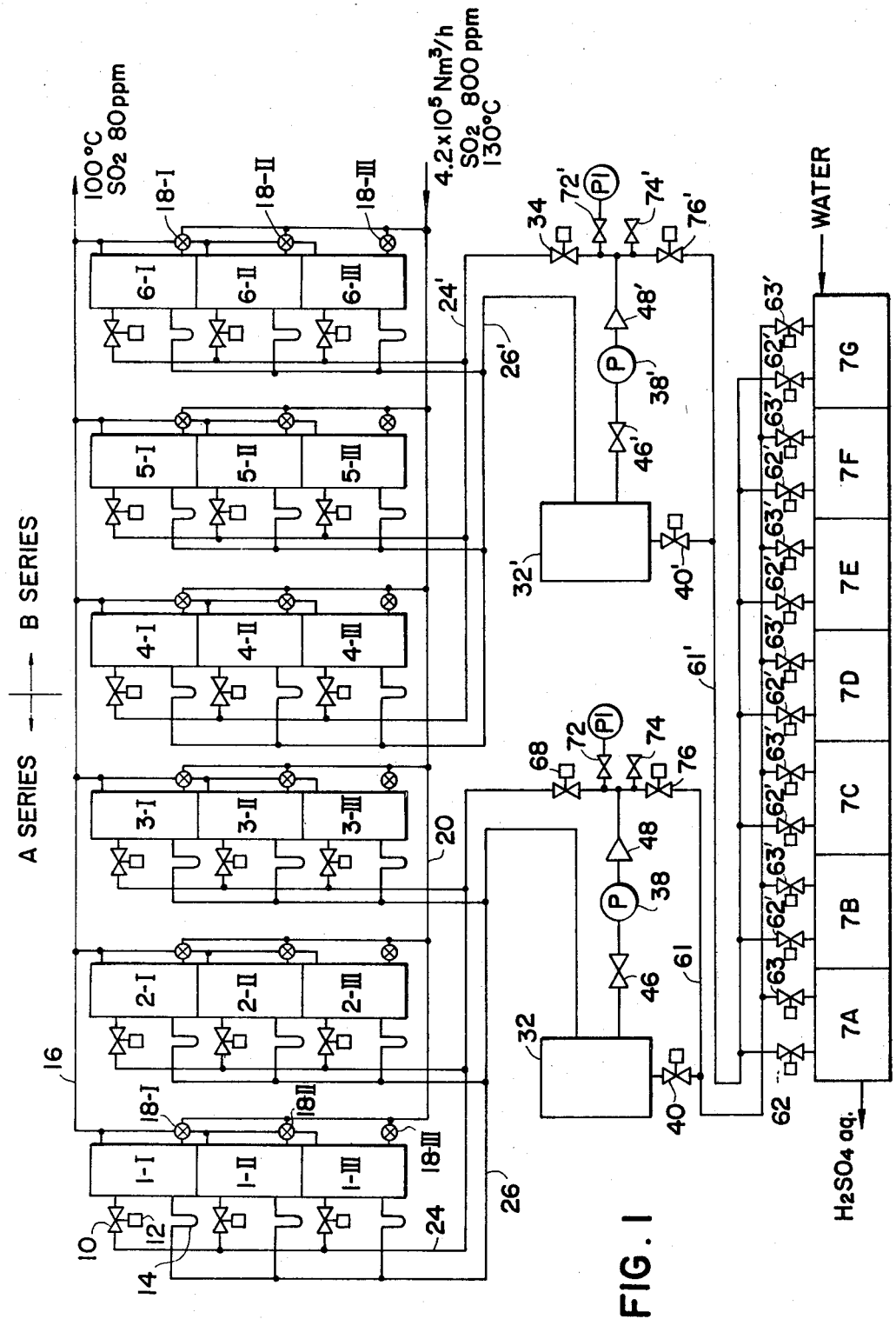
FIG. 1 is a schematic diagram illustrating an embodiment of the exhaust gas desulfurizing apparatus of the present invention.

As shown in FIG. 1, a plurality of adsorbing beds 1-I, 1-II through 6-II and 6-III are connected to an exhaust gas flue 20 respectively through a corresponding plurality of valves 18-I through 18-III. The exhaust gas is introduced from the flue 20 to the lower portion of the respective adsorbing beds that are packed with active carbon to travel through the active carbon adsorbent and thereafter exit from the upper portion of the adsorbing bed to a flue 16, following which the gas from the flue 16 is withdrawn from the system by means of a chimney (not shown).

Each adsorbing bed is connected in parallel to a regenerating liquid supply tube 24 or 24' through a valve 10, which valve is opened or closed by a controller 12. Many of the elements shown are identical for corresponding parts, for example a valve 10 and controller 12 is provided for each of the adsorbing beds, and the description will be simplified by providing numbers and specific descriptions for only some of the common elements. Further, the regenerating liquid is withdrawn through conduit 26 from the adsorbing beds, with the connection between the conduit 26 and the respective adsorbing beds being through a liquid seal device 14, or if desired any other appropriate valve.

The system illustrated in FIG. 1 employs a total of eighteen adsorbing beds, which are divided into left and right, as viewed in FIG. 1, unit adsorbing series, which have been referred to as series A and series B, respectively. Each series contains nine beds. The exhaust gas treatment by adsorption and the desorption by regeneration of the active carbon are conducted respectively in these two unit series A and B. Accordingly, the apparatus shown in FIG. 1 is an exhaust gas treatment apparatus including two series of unit adsorbing systems.

As a liquid for regenerating active carbon, water is used with the present preferred embodiment of the invention. When water is first used for washing of the active carbon, it dissolves desorbed $SO_3$, which is converted to an aqueous solution of sulfuric acid. Accordingly, the regenerating liquid referred to in this invention will include water and sulfuric acid solutions for the preferred embodiment.

Regenerating liquid will be introduced through pipes 24 and 24' to the respective beds of the series and correspondingly be withdrawn through pipes 26 and 26' that are connected to relay or holding tanks 32 and 32', respectively. More specifically, all of the regenerating storage tanks or containers 7A through 7G are connected to both relay tanks 32 and 32' by valves 62, 62' and 63, 63' respectively with valves 40 and 40'. Regenerating liquid conduits 61 and 61' are connected to the respective regenerating liquid supply pipes 24 and 24' for the beds through valves 68 and 34, valves 76 and 76', respectively. Relay tanks 32 and 32' are connected to the supply pipe 24 through valves 46, 46', pumps 38, 38', and check valves 48, 48', respectively. Valves 72 and 72' are provided with a pressure meter and sample collecting valves 74 and 74' are disposed between the regenerating liquid conduits 61, 61' and the supply pipes 24, 24', respectively.

The regenerating liquid tank 7A contains a solution of the highest sulfuric acid concentration, and the sulfuric acid concentration of the regenerating liquids is reduced in order through storage tanks 7B, 7C, 7D, 7E and 7F. In operation, the adsorbing bed that has entered into the regeneration cycle is washed first with the regenerating liquid from the tank 7B and this liquid after having passed through the respective bed has a higher concentration of sulfuric acid and is thereafter returned to the tank 7A, where it is collected as a waste liquid from the tank 7A. Thus the storage tank 7B will be empty or partially empty. Thereafter, the adsorbing bed is washed with a more dilute sulfuric acid solution contained in the tank 7C, and this solution will have its concentration of sulfuric acid increased as it passes through the adsorbing bed, so that the higher concentration of regenerating solution is thereafter returned to tank 7B. In this manner, with successive tanks, the sulfuric acid concentration of the regenerating liquid used for washing these adsorbing beds is successively passed through the adsorbing beds according to decreasing concentrations, and these concentrations are accordingly increased after passing through the adsorbing bed so that they will be at the next highest concentration.

Fresh water, that is water having no or a minimum concentration of the contaminant sulfuric acid will be fed into the tank 7G in an amount compensating for the amount of the regenerating liquid withdrawn from the tank 7A. In the case where active carbon is used as the adsorbent, $SO_2$ from the exhaust gas is adsorbed by the active carbon and oxidized to $SO_3$ by the catalytic activity of the active carbon, and as is well known in the art, the thus formed and adsorbed $SO_3$ reacts with water to form sulfuric acid.

In the embodiment of the adsorbing apparatus of the present invention, as compared with the prior art, accessory members such as relay tanks and attachments therefor are dispensed with. Provision of such members is not absolutely necessary, but it is advantageous to provide relay or holding tanks, because the regenerating liquid is prevented thereby from remaining in the passages when it is fed to the adsorbing beds from tanks 7B to 7G or when it is returned from the beds to tanks 7A to 7F.

Figure 2A:
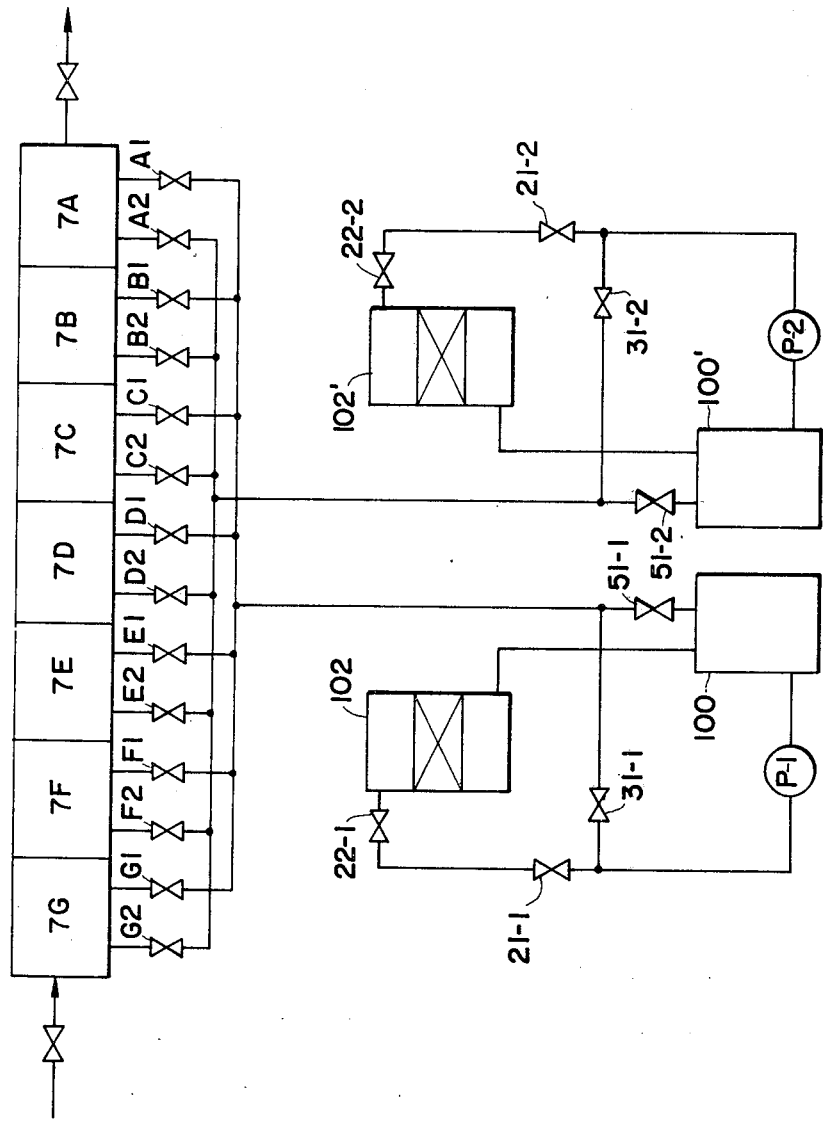
FIG. 2a is a simplified diagram illustrating the operation of the desulfurizing apparatus shown in FIG. 1.
Figure 2B:
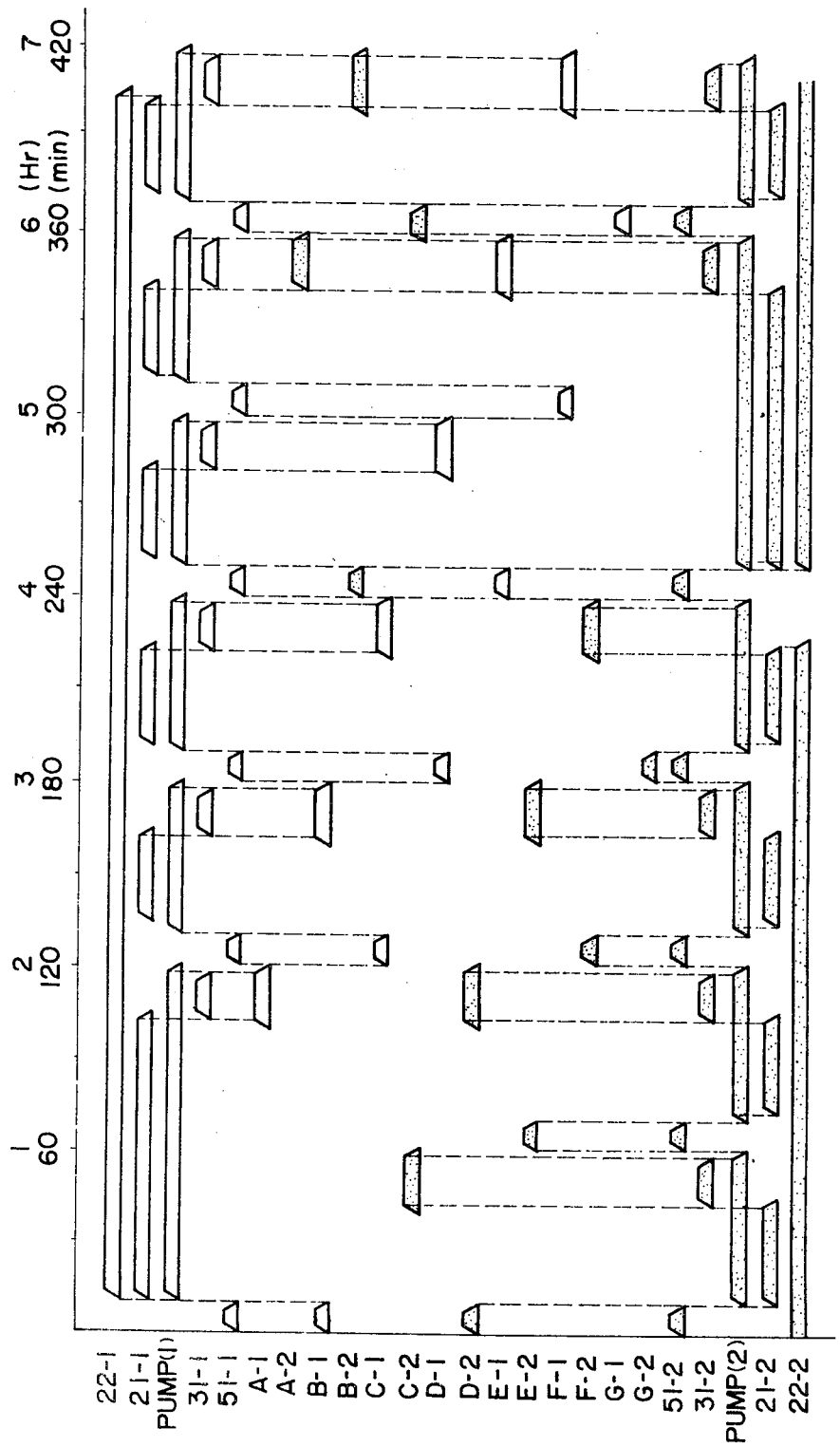

FIGS. 2a and 2b respectively illustrate the operation method and time schedule of the apparatus shown in FIG. 1. With the simplified diagram of FIG. 2a, various valves and elements have been renumbered in their simplified form for purposes of illustration. Valves A1 through G2 are provided respectively for the tanks 7A through 7G, as illustrated, and each tank is connected to relay tanks 100 and 100' through valves 51-1 and 51-2, respectively. As the adsorbing beds, there are illustrated only beds 102 and 102', to be subjected to the regenerating treatment in each of the unit series A and B, respectively. Although only one of the nine beds for each series has been illustrated in the simplified diagram of FIG. 2a, it will be seen that this is sufficient for describing the operation with respect to the two series, since for the other beds of the series the operation will merely be repeated.

The regenerating liquid quantities withdrawn from the tanks 7B through 7G are successively fed at different times to the beds 102 and 102' through valves 21-1, 21-2 and 22-1, 22-2, by means of pumps P-1, P-2, respectively. For this purpose, the storage tanks are successively connected to the respective relay tanks 100, 100' by valves 51-1, 51-2, and further the storage tanks are connected to the regenerating liquid feed side conduit through valves 31-1 and 31-2, respectively.

FIG. 2b is a diagram illustrating the time schedule for operating the desulfurizing apparatus of the simplified structure of FIG. 2a. For one cycle of operation (inclusive of both unit series A and B), is set to be completed in 7 hours. The operation of the series B (indicated by dotted units in the drawing) is delayed by about one-half cycle (4 hours) from the operation of the series A (indicated by blank units in the drawing).

The operation of the series A units will now be described in detail; and it will be appreciated, as seen from FIG. 2b, that the operation of the series B units will be conducted in the same manner as the operation of the series A units, but out of phase with a delay period of 4 hours. Accordingly, if only the operation of the series A is explained, those skilled in the art will readily understand the whole operation of the apparatus. Further, the operation with respect to only one bed of each of the series is shown and will be described with respect to FIGS. 2a and 2b, and it will be readily understood by those skilled in the art that the cycle may be repeated for all of the beds of the two series as shown in FIG. 1. Further, relay tanks 100, 100' of FIG. 2a generally correspond to relay tanks 32, 32' of FIG. 1; valves 62, 63, 62', 63' generally correspond to valves A-1 through G-2, and the correspondence between the remaining elements of FIGS. 1 and 2a may be readily seen.

As shown in FIG. 2b, the valves 51-1 and B-1 will be opened for 10 minutes at the beginning of the cycle illustrated to introduce the regenerating liquid from the storage tank 7B (that is the regenerating liquid having the higher sulfuric acid concentration next to that of the waste sulfuric acid solution within the storage tank 7A) into the relay or holding tank 100. After the valves 51-1 and B-1 are closed, the valve 22-1 is opened and the pump P-1 is driven with a small delay, the valve 21-1 is opened to introduce the regenerating liquid from the relay tank 100 into the upper portion of the adsorbing bed 102 (it being realized that the valves 18-1 through 18-3 have been operated to discontinue the passage of exhaust gas from the flue 20 through the bed 102 to the flue 16), whereby the active carbon adsorbent contained within the bed 102 having the adsorbed $SO_2$ in the form of $SO_3$ is washed and regenerated to increase the concentration of sulfuric acid within the regenerating liquid as it passes through the bed 102. The valve 21-1 is opened for about 1 hour and 25 minutes, and during this period the pump P-1 is being driven. Therefore, the regenerating liquid is circulated in a closed circuit between the adsorbing bed 102 and the relay tank 100 during which the washing is accomplished sufficiently for the particular concentration. Just prior to the closing of the valve 21-1, opening of the valve A-1 of the tank 7A is started while keeping the valve 21-1 in the open state; with a slight delay, the valve 31-1 is opened to introduce the regenerating liquid from the relay tank 100 into the storage tank 7A. A suitable amount of the sulfuric acid solution in the tank 7A is withdrawn and collected at suitable intervals, as a waste from the process. Simultaneously, fresh water is supplied into the tank 7G in an amount generally corresponding to the amount of high concentration sulfuric acid solution withdrawn from the tank 7A.

After the valve 31-1 is closed, the pump P-1 is stopped and the valve A-1 is closed, the valves 51-1 and C-1 are opened for ten minutes, and in the same manner as described above, the regenerating liquid in the tank 7C (having a sulfuric acid concentration lower than that of the regenerating liquid within the tank 7B) is introduced into the relay tank 100. After reclosing of these valves, the pump P-1 is driven again and the regenerating liquid in the relay tank 100 is fed to the upper portion of the adsorbing bed 102 with the opening of the valve 21-1 and the valve 22-1 remaining open throughout the cycle. Thus, the regenerating liquid will be circulated for 25 minutes. While keeping the pump P-1 in the driven state, the valve 21-1 is closed and the valves 31-1 and B-1 are opened to introduce the regenerating liquid from the relay tank into the tank 7B.

Thereafter, the circulation of the regenerating liquid is repeated in the same manner as described above, as shown in the diagram of FIG. 2b for the remaining storage tanks, and at the final stage, the regenerating liquid, water, in the tank 7G is introduced into the relay tank 100 and the adsorbing bed 102 is washed for about 25 minutes by this regenerating liquid traveling in a closed circuit with the bed 102 and relay tank 100 to thereby regenerate the active carbon substantially completely. In this manner, the series A unit is operated, which operation cycle of FIG. 2b may be repeated for each of the beds of the series A.

The series B unit is operated in the same manner as mentioned above, but with a delay of 4 hours from the operation of the series A unit, that is the cycles for the series A and B are out of phase. Because of this phase difference, the cycle for the series A to utilize the tanks 7A through 7G does not interfere with the cycle for the series B to utilize the same tanks 7A through 7G, and both the series A and the series B can be operated smoothly and conveniently with respect to the same regenerating fluid, with the result that one group of regenerating liquid tanks is sufficient even if a plurality of series of adsorbing beds are provided, so that the apparatus size can be minimized. Thus, the present invention can attain great ecomonical advantages. It is realized that the two series may be out of phase by amounts other than 4 hours or approximately one-half cycle, so long as one storage tank will not be simultaneously used by two series, and it is seen that many more series than two series of adsorbing beds may be regenerated in the cycle of FIG. 2b out of phase with each other without interference.

Results obtained when the apparatus shown in FIG. 1 were operated under the following conditions according to the time schedule shown in FIG. 2b are as follows:

Amount of exhaust gas: 420,000 $Nm^3/h$
Exhaust gas temperature at inlet of adsorbing apparatus: 130°C
Composition of exhaust gas: 12 vol. % $CO_2$, 10 vol. % $H_2O$, 5 vol. % $O_2$, 800 ppm $SO_2$, the balance being $N_2$
Configuration of active carbon: pellets of 5–8 mm diameter
Height of active carbon in adsorbing bed: 2 m
Amount of active carbon: 40 $m^3$ per bed
Capacity of tanks 7A through 7G: 50 $m^3$ per tank
Water temperature: 20°C
Capacity of pumps 38, 38′: 250,000 Kg/h
Sulfuric acid concentrations in tanks 7A through 7G (liquid temperature):
  tank 7A: 20 % (70°C)
  tank 7B: 14 % (60°C)
  tank 7C: 10 % (50°C)
  tank 7D: 7 % (40°C)
  tank 7E: 5 % (30°C)
  tank 7F: 3 % (25°C)
  tank 7G: 0 % (20°C)
Desulfurizing ratio: 90 % ($SO_2$ content in waste gas from flue 16 being about 80 ppm)

In the foregoing specific embodiment for purposes of illustration, the phase difference between the series A and series B is about one-half cycle (4 hours), but the phase difference is not limited to this value. Namely, an optional phase difference may be adopted, as far as the series do not interfere with each other with respect to utilization of the group of regenerating liquid tanks. For instance, in the case of three or four series of adsorbing beds being provided, it is possible to adopt a phase difference corresponding to one-third or one-fourth of one cycle.

As is readily understood from the characteristic features of the present invention, it is desirable in this invention that each unit series comprise a plurality of adsorbing beds. However, if each series includes only one adsorbing bed, a bed of one series is being kept in the adsorbing stage until regeneration of a bed of the other series has been substantially completed, so that the contamination removal of exhaust or process gases will be carried on continously.

The number of regenerating liquid storage tanks is determined depending upon the desired sulfuric acid concentration in the liquid to be withdrawn from the final tank 7A, and the $SO_2$ concentration in the exhaust gas to be treated as well as the amount of exhaust gas (absolute amount of $SO_2$). In ordinary exhaust gas desulfurization apparatuses, in view of the utilization and transportation of the recovered sulfuric acid, the waste liquid is recovered in the form of sulfuric acid solution of a concentration of about 20%. In such a case, it is advantageous to provide, as is seen in the foregoing embodiment, seven tanks in one series, if the tank capacity and the recovery ratio are taken into consideration.

While a preferred form of the present invention has been described in detail with respect to its method of operation and apparatus employed, it is understood that the broader more basic concepts of the present invention may be employed in other purification systems for gas and liquid. Accordingly, further embodiments, variations and modifications are contemplated according to the broader aspects of the present invention, even though the more specific details are important in their own right, all according to the spirit and scope of the following claims.

What is claimed is:

1. In a process for removing sulfur dioxide contaminates from a process gas by passing the process gas through separate beds of material that will remove sulfur dioxide contaminates during a process period for each bed, and regenerating said beds by passing separate quantities of aqueous regenerating liquid of successively less sulfuric acid concentration from respective separate storage tanks through each bed to remove sulfur dioxide contaminates from said material of the bed and carry the contaminates away with the regenerating liquid to regenerate the bed during a regeneration period for each bed separate from its process period, wherein the improvement comprises: overlapping said regenerating for one bed with at least one other bed out of phase, by passing a first quantity of regenerating liquid of a predetermined sulfuric acid concentration from one storage tank through the one bed and returning it to a second higher concentration strorage tank, and thereafter passing regenerating liquid from said second higher concentration tank through the other bed and returning it to a third higher concentration storage tank during the regeneration period of said one bed.

2. The process of claim 1, including: dividing all of said beds into at least a first series of beds including said one bed and a second series of an equal number of said beds including said other bed; the regeneration periods of said first series being non-overlapping and successive, and the regeneration periods of said second series being non-overlapping, successive and out of phase with the regeneration periods of said first series.

3. The process of claim 2, wherein said step of regenerating for each bed of said first series successively withdraws a quantity of regenerating liquid from its respective storage tank, maintains the thus withdrawn regenerating liquid in a closed recirculation path through the bed and only one holding tank common to said first series of beds separate from said storage tanks; said step of regenerating for each bed of said second series successively withdraws a quantity of regenerating liquid from the respective storage tanks, maintains the thus withdrawn regenerating liquid in a closed recirculation path through the bed and only one separate holding tank common to said second series of beds and separate from said storage tanks; said step of regenerating thereafter withdraws the highest concentration regenerating liquid from the process and successively withdraws the remaining quantities of regenerating liquid from the respective holding tanks and passes them to the storage tank having the next highest concentration; said step of regenerating fills the storage tank with the lowest concentration regenerating liquid with fresh water after each time that the regenerating liquid within said lowest concentration storage tank is passed to one of said holding tanks.

* * * * *